United States Patent [19]
Watanabe et al.

[11] 3,825,942
[45] July 23, 1974

[54] SHUTTER FOR CAMERAS
[75] Inventors: Hiroaki Watanabe, Fujisawa; Soichi Nakamoto, Tokyo, both of Japan
[73] Assignee: Canon Kabushiki Kaisha, Tokyo, Japan
[22] Filed: July 31, 1973
[21] Appl. No.: 384,281

[30] Foreign Application Priority Data
Aug. 8, 1972   Japan.............................. 47-79359

[52] U.S. Cl. .............................................. 354/267
[51] Int. Cl. ............................................. G03b 9/62
[58] Field of Search ........ 95/53 R, 53 E, 53 EB, 57, 95/10 C, 10 CT; 354/267

[56] References Cited
UNITED STATES PATENTS
3,303,766   2/1967   Karikawa et al. .................... 95/10 C
3,645,186   2/1972   Kitai ................................. 95/53 EB
3,657,982   4/1972   Uno et al. ............................. 95/57
3,670,636   6/1972   Holle et al. ............................ 95/57
3,744,392   7/1973   Dahlgren et al. ....................... 95/57

Primary Examiner—Joseph F. Peters
Attorney, Agent, or Firm—Flynn & Frishauf and William R. Woodward

[57] ABSTRACT

In a camera shutter wherein high shutter speeds are controlled mechanically and low shutter speeds are controlled electrically, there is provided a shutter opening control member and a shutter closing control member whose relative position is adjustable in accordance with a set shutter speed and which are movable together over a predetermined stroke, during which the two control members act on a shutter opening member and a shutter closing member in succession to control the shutter mechanically. For low shutter speeds, the closing control member during its predetermined stroke does not act on the closing member but actuates the latter member during an additional movement imparted to the closing control member by electromagnet means.

2 Claims, 5 Drawing Figures

PRIOR ART

3,825,942

3,825,942

SHUTTER FOR CAMERAS

BACKGROUND OF THE INVENTION

1. Field of the Invention

This invention relates to a shutter having a mechanical timer device and an electronic timer device in which high shutter speed control is accomplished by the mechanical timer device and low shutter speed control is accomplished by the use of both the mechanical and the electronic timer device.

2. Description of the Prior Art

There have already been proposed shutters having a mechanical timer device and an electronic timer device, one of which is used for shutter speed control. For example, U.S. Pat. No. 3,303,766 discloses a shutter in which the so-called "EE" photography is accomplished by means of an electronic timer device while manual photography is done by means of a mechanical timer device.

Shutters having a mechanical and an electronic timer device have also been proposed which utilize the mechanical one for high shutter speed control and the electronic one for low shutter speed control.

In any of these shutters provided with mechanical and electronic timer devices, however, the individual timer devices have been used independently of each other. Therefore, the controllable shutter speeds have been limited to the ranges which can be controlled by the individual timer devices. More specifically, where the mechanical timer device can control the shutter speeds ranging from 1/100 to 1/1000 sec. and the electronic timer device can control the range from 1/50 to 1 sec., a shutter having such timer devices can merely control the shutter speeds within the range of 1 to 1/1000 sec.

SUMMARY OF THE INVENTION

It is an object of the present invention to overcome the above-noted disadvantages and to increase the controllable shutter speed range by using and operating both a mechanical and an electronic timer device and operating them simultaneously.

According to an embodiment of the present invention, there is provided a shutter for a camera having mechanical shutter control means and electrical control means which comprises a shutter opening member, an opening control member acting on the shutter opening member, a shutter closing member, a closing control member acting on the shutter closing member, and a timer circuit including electromagnet means. The opening and closing control members are connected together so that their relative position is adjustable in accordance with a set exposure time. The control members are both movable over a predetermined stroke to effect shutter release. The electromagnet means is capable of imparting to the control members an additional movement exceeding the predetermined stroke. Thus, when the shutter is set to a high speed, the two control members during their predetermined strokes act on the shutter opening and closing members to open and close the shutter. When the shutter is set to a low speed, the opening control member during its predetermined stroke acts on the opening member while the closing control member acts on the closing member due to the additional movement imparted thereto by the electromagnet means. The electromagnet means is movable with the control members over the predetermined stroke and after being stopped at a predetermined position, it is energized by the timer circuit to impart the additional movement to the control members.

The invention will become more fully apparent from the following detailed description taken in conjunction with the accompanying drawings.

DESCRIPTION OF THE PREFERRED EMBODIMENTS

Figure 1:
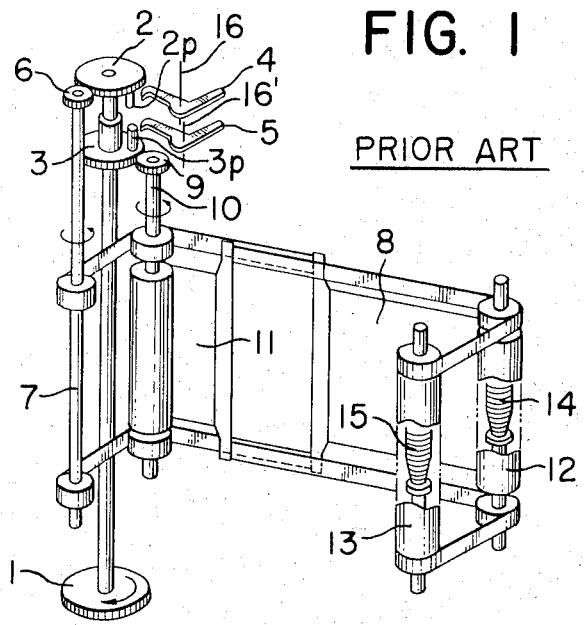
FIG. 1 shows a prior art shutter controlled by a mechanical timer device.

In order to make the present invention better understood, a conventional focal-plane shutter will first be considered with reference to FIG. 1. It is to be understood that the present invention is not restricted to the focal-plane shutter but an application thereof to such shutter is only shown herein simply for convenience of illustration.

In FIG. 1, reference numeral 1 designates a shutter charge gear rotatable in the direction of arrow by a film advance lever (not shown). Reference numeral 2 designates a forward curtain master gear coaxial with the gear 1. Reference numeral 3 denotes a rearward curtain master gear which is also coaxial with the gear 1. The gears 2 and 3 have studded pins $2p$ and $3p$ which serve to transmit clockwise rotational movement of the gear 2 to the gear 3 during shutter charge and which may be retained by retaining pawls 4 and 5 for controlling the movements of forward and rearward shutter curtains to hold these curtains in their respective charged conditions. In order that the pins $2p$ and $3p$ may achieve such functions, the gear 2 must be integrally connected to the gear 1 by means of a shaft and the gear 3 must be free to rotate without interlocking with the gear 1. A gear 6 meshes with the forward curtain master gear 2 to rotate a shaft 7 which in turn advances a forward shutter curtain 8. A gear 9 meshes with the rearward curtain master gear 3 to rotate a shaft 10 which in turn advances a rearward shutter curtain 11. Forward and rearward shutter curtain take-up drums 12 and 13 have springs 14 and 15 therein which normally bias the forward and rearward shutter curtains in take-up direction.

Thus, when depression of a shutter release button (not shown) causes the forward shutter curtain retaining pawl 4 to be rotated clockwise about a shaft 16 through the intermediary of an interlocking mechanism (not shown) so that the pawl 4 releases the pin $2p$, the gears 2 and 6 become rotatable to permit the forward curtain 8 to be moved by the bias force of the spring 14 in the forward curtain take-up drum 12. On the other hand, the rearward shutter curtain retaining pawl 5 is rotated clockwise about the shaft 16 by the output of an unshown timer device to release the pin 3p, whereby the gears 3 and 9 become rotatable to permit the rearward curtain 11 to be moved by the bias force of the spring 15 in the rearward curtain take-up drum 13. This movement of the rearward curtain 11 terminates an exposure time.

Figure 2:
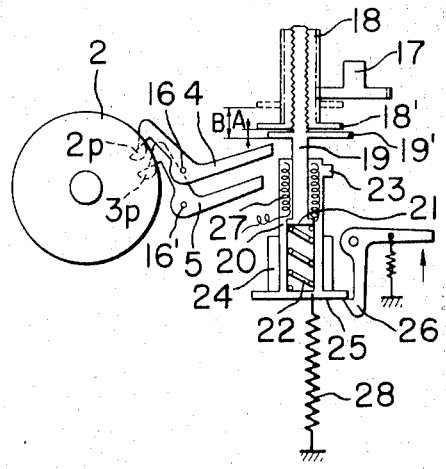
FIG. 2 shows an embodiment of the shutter according to the present invention, the shutter being in a position prior to shutter operation.
Figure 3:
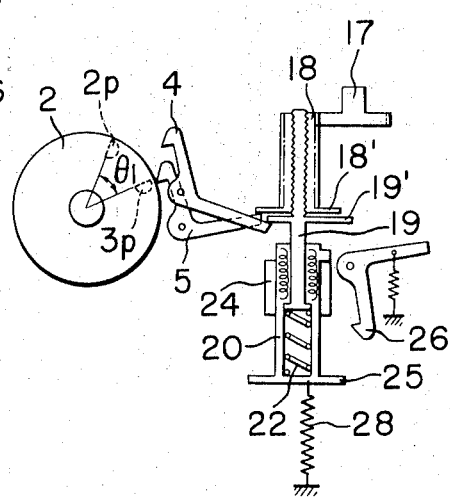
FIG. 3 shows the shutter of FIG. 2 as set to a high speed and illustrates the operation of the shutter in such position.
Figure 4:
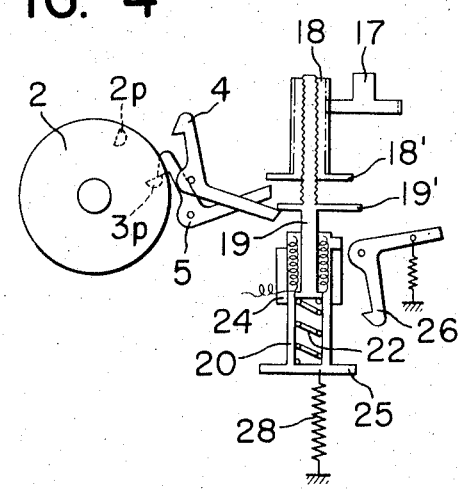
FIG. 4 shows the same shutter as set to a low speed and illustrates the manner in which the shutter begins to open.
Figure 5:
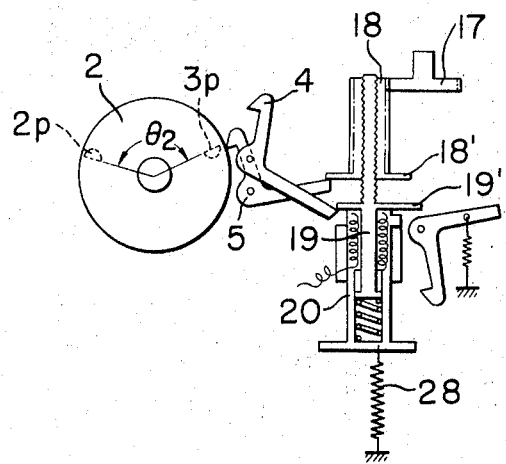
FIG. 5 is a view similar to FIG. 4 but illustrating the manner in which the shutter is closed.

FIGS. 2 to 5 show an embodiment of the shutter according to the present invention. FIGS. 2 and 3 refer to a case where a mechanical timer device is used to control high shutter speeds, and FIGS. 4 and 5 show a case where an electronic timer device is used simultaneously with the mechanical timer device to control low shutter speeds.

In these Figures, reference numeral 2 corresponds to the forward curtain master gear indicated in FIG. 1. Although not shown, the rearward curtain master gear 3 is located at the back of the gear 2. The pin 3p studded in the gear 3 is only indicated by dotted line. Likewise, the pin 2p is indicated by dotted line. Numeral 17 denotes a gear interlocking with a shutter speed setting member (not shown) such as shutter speed setting dial or the like, the gear 17 being supported for rotation about a fixed shaft but against axial movement. A cylindrically shaped gear 18 meshes with the gear 17. This gear 18 is formed with a spur gear on its outer periphery and a thread on its inner periphery. The gear 18 has its lower end formed as a control flange 18' which is engageable by the rearward curtain retaining pawl 5 when the gear 18 has been moved down to its lower position. The internally threaded portion of the gear 18 receives therein a shaft 19 formed with a complementary threaded portion.

The shaft 19 has a control flange 19' formed intermediately thereof. The flange 19' may bear against and actuate the forward curtain retaining pawl 4 when the shaft 19 has moved down. The shaft 19 has a further flange 21 formed at the lower end thereof to prevent the shaft 19 from slipping out of a cylinder 20. A spring 22 is disposed within the cylinder 20 to bias the shaft 19 upwardly. A stop 23 is formed on the upper end portion of the cylinder 20 and may bear against a fixed ring 24 to limit the downward movement of the cylinder 20. A flange 25 is formed at the bottom of the cylinder 20. The flange 25 may bear against the fixed ring 24 to limit the upward movement of the cylinder 20 and is also engageable by a lever 26 which will be described. An electromagnetic coil 27 is disposed within the cylinder 20 and controlled by a conventional electronic timer curcuit. Upon a current flowing through the coil 27, the flange 19' of the shaft 19 may be attracted toward the cylinder 20 against the force of the spring 22 within the cylinder 20. A spring 28 biases the cylinder 20 downwardly. The lever 26 is engageable with the bottom flange 25 of the cylinder 20 to retain this cylinder against downward movement with the aid of the spring 28. This lever 26 is operatively connected to a shutter release button (not shown) so that first-stage depression of the button causes the lever 26 to rotate counter-clockwise to thereby release its engagement with the flange 25. Operation of the present embodiment will now be described. A shutter dial (not shown) is turned to set the shutter speed, whereby the gear 17 is rotated. The rotational movement of the gear 17 is transmitted to the gear 18. Thus, the gear 18 is rotated as it is moved axially upwardly or downwardly by means of the threadable engagement with the shaft 19.

Here it is to be understood that the shaft 19 is unrotatable about its axis. The axial movement of the gear 18 sets the distance between the flanges 18' and 19' to a certain value. Such distance is (A) smaller for higher shutter speed setting and (B) greater for lower shutter speed setting. The case of higher shutter speed setting will be explained by reference to FIGS. 2 and 3. It will here be noted that an electronic timer circuit (not shown) is rendered inoperative by the shutter dial or by an unshown switch adapted to open in accordance with the position of the flange 18' of the gear 18. As a result, there is no current flowing through the coil in the cylinder 20 during the shutter time limit. Depression of the shutter release button causes counter-clockwise rotation of the lever 26 which thus releases the cylinder 20. With this release, the cylinder 20 is moved downwardly by the force of the spring 28. The downward movement of the cylinder 20 causes the gear 18 and shaft 19 to be moved down together. Consequently, the forward shutter curtain retaining pawl 4 and the rearward shutter curtain retaining pawl 5 are engaged by the flanges 18' and 19', respectively, so that these pawls release the forward and rearward curtain master gears for rotation. Since the distance between the flanges 18' and 19' has been set to a value corresponding to the set shutter speed, the rearward curtain master gear 3 is later in starting to rotate than the forward curtain master gear 2 by an amount equal to an angle θ (see FIG. 3), so that there is provided between the forward and rearward curtains a slit corresponding to the amount of delay θ, the width of such slit determining the exposure time.

In order that a shift may occur from the position shown in FIG. 3 where the shutter operation has terminated to the position shown in FIG. 2 which is the position prior to the shutter operation, the film advance lever or the like may be actuated to lift the cylinder 20 until this lever is retained by the lever 26.

The case of lower shutter speed will now be described by reference to FIGS. 4 and 5. In this case, the gear 18 has been moved to its position as indicated by dotted line in FIG. 2. Thus, there is a distance B between the gears 18 and 19. Further, the aforementioned switch operatively connected to the shutter speed setting dial or the like is in closed position and therefore, the electronic timer circuit (not shown) is ready to operate when a conventional main switch in the timer circuit is closed upon depression of the shutter release button. Thus, a current flows through the coil 27 after the electronic timer circuit has completed its time limit operation. Depression of the shutter release moves down the cylinder 20 with the gear 18 and the shaft 19, in the same manner as described previously. The forward curtain retaining pawl 4 is rotated by the flange 19' of the shaft 19, thus releasing the forward curtain master gear 2. Upon such release, the forward shutter curtain is moved to open the shutter. Simultaneously with this movement of the forward shutter curtain, the electronic timer circuit starts its time limit operation. However, the cylinder 20 is stopped from downward movement by the stop 23. Since the distance is now wider between the flanges 18' and 19' of the gear 18 and the shaft 19, the flange 18' of the gear 18 is not engageable with the rearward curtain retaining pawl 5. Thus, the rearward shutter curtain remains held. Upon termination of the time limit operation of the electronic timer circuit, a current flows through the coil 27 to attract the flange 19' of the shaft 19 against the force of the spring 20. With this attraction the gear 18 is also moved down as shown in FIG. 5, so that the rearward curtain retaining pawl 5 engages the flange 18' of the gear 18 to release the rearward curtain master gear 3, thus closing the shutter.

Thus, according to the present invention, high-speed shutter operation can be stable and control of shutter speeds can be effected over a wider range, and in addition, the use of both an electronic and a mechnaical timer portion is useful to reduce the number of parts.

We claim:

1. A shutter for a camera having mechanical shutter control means and electrical control means, said shutter comprising a shutter opening member, an opening control member acting on said shutter opening member, a shutter closing member, a closing control member acting on said shutter closing member, and a timer circuit including electromagnet means, setting means connecting said opening and closing control members together for adjusting their relative position in accordance with a set shutter speed, said control members being movable together over a predetermined stroke to effect shutter release, said predetermined stroke being insufficient to release said shutter closing member in the case of a low speed shutter setting, said electromagnet means being capable of imparting to said control members an additional movement exceeding said predetermined stroke, whereby when the shutter is set to any of a number of high speed settings said two control members during said predetermined stroke act on said shutter opening and closing members to open and close the shutter, and when the shutter is set to a low speed setting said opening control member during said predetermined stroke acts on said opening member while said closing control member acts on said closing member due to said additional movement imparted thereto by said electromagnet means.

2. A shutter according to claim 1, wherein said electromagnet means is movable with said control members over said predetermined stroke and after being stopped at a predetermined position, it is energized by said timer circun to impart said additional movement to said control members.

* * * * *

UNITED STATES PATENT OFFICE
CERTIFICATE OF CORRECTION

Patent No. 3825942             Dated July 23, 1974

Inventor(s) Hiroaki WATANABE et al.

It is certified that error appears in the above-identified patent and that said Letters Patent are hereby corrected as shown below:

In column 6, line 21 (claim 2), change "circun" to -- circuit --.

Signed and sealed this 29th day of October 1974.

(SEAL)
Attest:

McCOY M. GIBSON JR.           C. MARSHALL DANN
Attesting Officer             Commissioner of Patents